United States Patent

Ishikawa et al.

[11] Patent Number: 5,876,119
[45] Date of Patent: Mar. 2, 1999

[54] IN-SITU SUBSTRATE TEMPERATURE MEASUREMENT SCHEME IN PLASMA REACTOR

[75] Inventors: Tetsuya Ishikawa, Santa Clara; Brian Lue, Mountain View, both of Calif.

[73] Assignee: Applied Materials, Inc., Santa Clara, Calif.

[21] Appl. No.: 574,838

[22] Filed: Dec. 19, 1995

[51] Int. Cl.⁶ .................................................. G01K 1/16
[52] U.S. Cl. ............................................................ 374/134
[58] Field of Search .................................. 374/120, 121, 374/134

[56] References Cited

U.S. PATENT DOCUMENTS

| | | | |
|---|---|---|---|
| 3,542,123 | 11/1970 | Hornbaker et al. | 374/134 |
| 3,715,923 | 2/1973 | Hornbaker et al. | 374/134 |
| 4,560,286 | 12/1985 | Wickersheim | 374/131 |
| 5,098,198 | 3/1992 | Nulman et al. | 374/121 |
| 5,106,200 | 4/1992 | Hosokawa | 374/121 |
| 5,249,142 | 9/1993 | Shirakawa et al. | 374/121 X |
| 5,294,200 | 3/1994 | Rall | 374/120 |

FOREIGN PATENT DOCUMENTS

| | | | |
|---|---|---|---|
| WO 89/06349 | 7/1989 | European Pat. Off. | 374/120 |
| 54-58712 | 11/1980 | Japan | 374/134 |

*Primary Examiner*—George Dombroske
*Assistant Examiner*—Paul D. Amrozowicz
*Attorney, Agent, or Firm*—Patterson & Associates

[57] ABSTRACT

A method and apparatus for noncontact temperature measurement of a substrate insitu by measuring the temperature of a substrate support member and an intermediate member located between the substrate and the substrate support member. The intermediate member has a given heat transfer surface area adjacent both the substrate and the substrate support member and high thermal conductivity so that the intermediate member rapidly approaches a steady state surface temperature after the substrate is positioned in the substrate support member. In this arrangement, the temperature of the substrate can be determined either by calibration or application of a heat transfer equation. Various temperature measuring instruments may be used, including a light probe located in the substrate support member normal to the surface of the intermediate member to measure the radiation from a temperature sensitive material deposited on the bottom surface of the intermediate member.

36 Claims, 4 Drawing Sheets

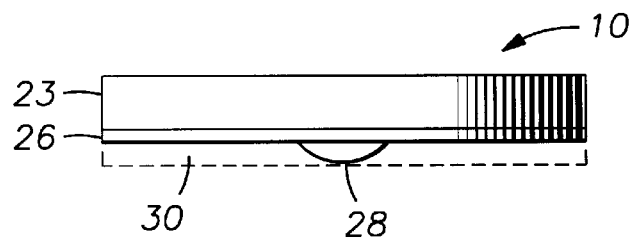
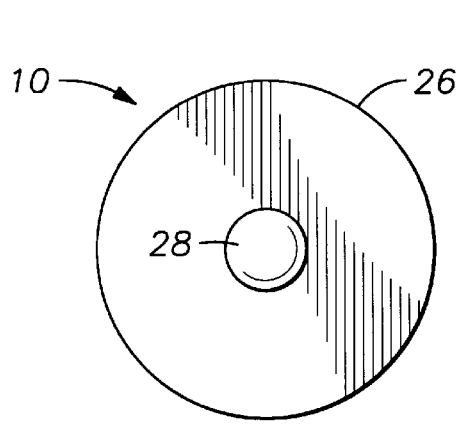
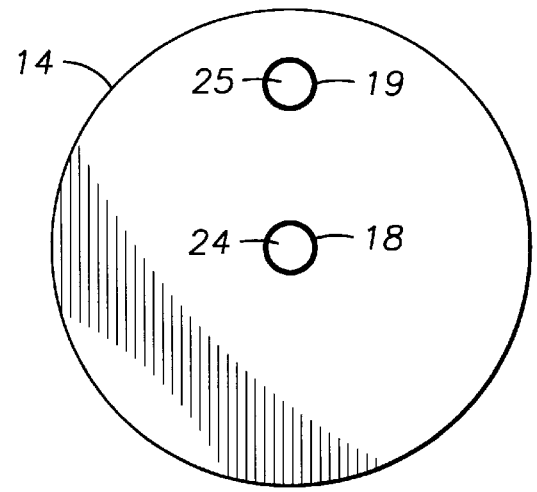
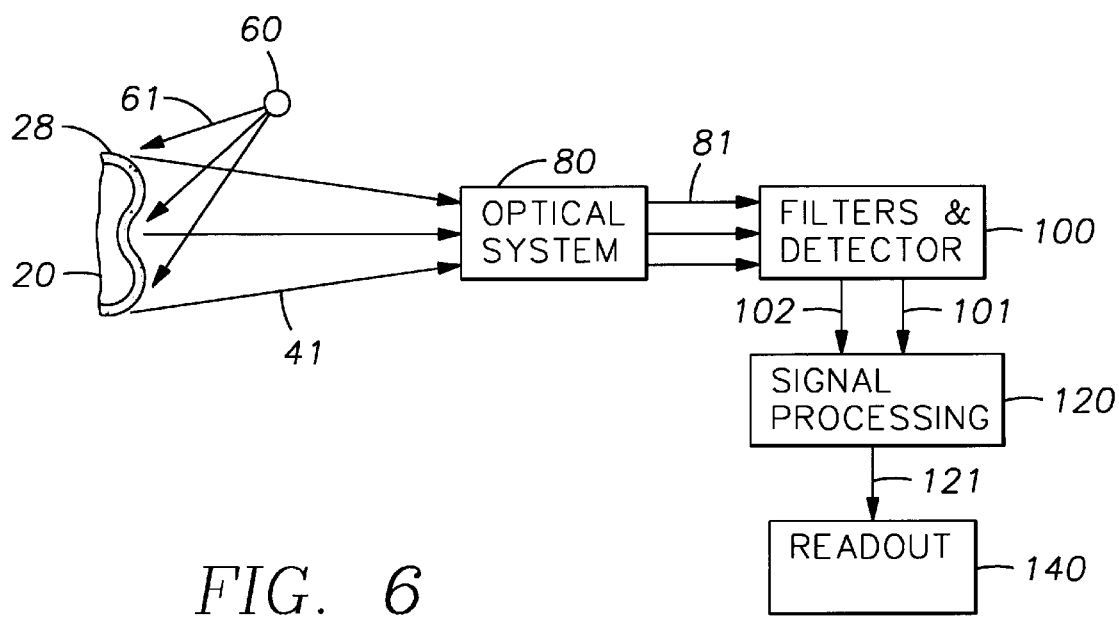

IN-SITU SUBSTRATE TEMPERATURE MEASUREMENT SCHEME IN PLASMA REACTOR

BACKGROUND OF THE INVENTION

1. Field of the Invention

The present invention relates generally to devices and methods for making temperature measurements. More particularly, the present invention relates to devices and methods for measuring the temperature of a semiconductor substrate through non-contact arrangements utilizing a temperature sensitive member located adjacent the substrate to be measured.

2. Background of the Art

The fabrication of semiconductor devices on substrates typically requires the deposition and etching of multiple metal, dielectric and other semiconductor film layers on the surface of a substrate. The film layers are typically deposited onto, and etched from, the substrates in vacuum chambers. Controlling the deposition and etch rate uniformity are critically important to the manufacture of integrated circuits. One of the parameters which must be tightly controlled during such deposition or etching process is the film temperature, which is particularly important for fabricating semiconductor multilayer structures from silicon (Si) or gallium arsenide (GaAs). It is also critical to obtaining high-$T_c$ (high critical temperature) superconductor film of optimal quality on a substrate.

There are many methods currently used for temperature measurement of the substrate or film layer. One common technique is to locate thermocouples thermistors or resistance thermometers in the chamber to inferentially measure the substrate temperature. In some cases, the temperature measuring device has been embedded in the substrate support where it is protected from the environment of the vacuum chamber. An electrical signal is generated by the device, which is then converted into temperature readings or employed for control functions.

In certain situations, it is necessary or desirable to obtain temperature data by non-electrical techniques. This may occur: (1) where temperatures over large areas are to be measured and measurement by a dense distribution of thermocouples thus becomes impractical; (2) where the attachment of thermocouples and leads to the chamber would alter the temperatures to be measured; (3) in environments where, because of high electric or magnetic fields, metallic wires are undesirable; (4) where electrical isolation and/or insensitivity to electrical noise generation is desired; (5) where, because of motion or remoteness of the part to be sensed, permanent lead wires are impractical; or (6) where, because of corrosive chemical environments, wires and thermocouple junctions would be adversely affected, with resultant changes in electrical characteristics and erratic or erroneous temperature readings. For example, a plasma, such as used in chemical vapor deposition, can have an adverse effect on conventional temperature monitoring probes placed in physical contact with the substrate, and any contact between the probe and the substrate may cause substrate defects in the vicinity of the contact area. Such contact can cause high-density circuitry formed on the substrate near the contact area to be destroyed, thereby reducing substrate yield and the number of chips recoverable from a single substrate.

The above considerations are important for determining production worthiness of processing tools used for adding and removing materials from semiconductor substrates. A dielectric substrate formed of silicon or a III-V or II-IV compound, such as gallium arsenide or zinc telluride, is typically processed in a high-vacuum environment. This environment can have an adverse effect on conventional temperature monitoring probes placed in physical contact with the substrate, and contact between the probe and the substrate may cause substrate defects in the vicinity of the contact area. Such contact can cause high-density circuitry formed on the substrate near the contact area to be destroyed, thereby reducing substrate yield and the number of chips recoverable from a single substrate.

Therefore, in some process situations, radiation pyrometry techniques are preferable since they measure the temperature of an object by means of the quantity and character of the energy which it radiates. These techniques can be applied to semiconductor manufacturing to avoid the problems associated with temperature probes being in contact with the substrate. Therefore, optical pyrometers and light probes may be used to monitor substrate temperature by comparing the in-spectral intensity of the hot substrate with that of a source of standard intensity. To provide an accurate indication of substrate temperature from an optical pyrometer, the emissivity of the substrate must be known. With currently available pyrometer techniques, it is very difficult, if not impossible, to ascertain accurately emissivity of a semiconductor substrate undergoing processing for manufacture of integrated circuits. At temperatures below approximately 600° C., undoped silicon is transparent to infrared energy. As the temperature or doping level of the substrate increases, the substrate becomes less transparent to infrared energy. The decrease in transparency causes the emissivity of radiant energy that can be detected by an optical pyrometer to change in a fairly unpredictable manner. Emissivity of optical energy from the substrate is also dependent on how rough the substrate emitting surface is. In addition, substrate emissivity as a whole is a function of material deposited on the face of the substrate in the optical pyrometer field of view. Since emissivity from the substrate is variable, the output of the optical pyrometer is frequently not an accurate indication of substrate temperature.

Presently, the optical techniques used to measure temperature of a substrate require placement of a temperature sensitive material onto the backside of a substrate so that the decay of that material and light emissions associated therewith can be measured. A light probe is housed within the support member below the substrate receiving surface of the support member. The light probe excites the temperature sensitive material and causes it to emit radiation. The emitted radiation is quantified and compared with known temperature values. One drawback to this method is that it requires additional processing steps to be performed on the substrate prior to the continual formation of integrated circuits thereon. In addition to increased cost and time, the material deposited on the substrate for this purpose may jeopardize the integrated circuits ultimately formed on the substrate.

U.S. Pat. No. 4,560,286, entitled "Optical Temperature Measurement Techniques Utilizing Phosphors", Wickersheim, incorporated herein by reference, describes a method and apparatus for measuring the temperature of an object provided with a phosphor material layer that emits at least two optically isolatable wavelength ranges whose intensity ratio depends upon the object or environment temperature. The emitted radiation is quantified by an optical system that may include an optical fiber. One known application utilizing this art is the measurement of substrate temperature by providing a small amount of temperature sensitive material on the backside of the substrate. A light detecting member is provided within the substrate support member normal to the surface on which the temperature sensitive material is placed to measure the emitted radiation from the temperature sensitive material. A processor quantifies the emitted radiation and determines the temperature of the substrate.

This technique, however, requires that the temperature sensitive material be placed on the backside of the semiconductor substrate. This poses several problems. First, the phosphor material may migrate into the silicon substrate on which it is provided. Second, the process of applying the temperature sensitive material to the backside of the substrate requires additional processing steps which are both time consuming and expensive.

Therefore, there exists a need for an apparatus and method for determining the temperature of a substrate during processing through a non-contact arrangement utilizing optical techniques which eliminate the need to deposit temperature sensitive material on the substrate.

SUMMARY OF THE INVENTION

Generally, the present invention provides an apparatus and method for determining the temperature of an object in situ through measurement of the temperature of an intermediate member having a known thermal relationship with an adjacent surface of the object.

In one aspect of the present invention, an apparatus is provided comprising a semiconductor substrate support member, an intermediate member, and a temperature measuring instrument. The intermediate member is located adjacent the substrate support member in a passage defined between the support member and the substrate. The intermediate member has first and second surfaces positioned in a sufficiently close relationship between the adjacent surfaces of the substrate support member and the substrate to have a known thermal relationship therebetween. It is preferred that the apparatus is designed so that the thermal relationship is essentially that of free molecular thermal conduction. The temperature of the intermediate member can be measured with any temperature measuring instrument such as a thermocouple, thermistor, resistance thermometer, optical pyrometer, or radiation pyrometer. In one embodiment, the intermediate member may be provided with a temperature sensitive element on one surface, the temperature sensitive element characterized by emitting, when excited, detectable optical radiation that varies as a known function of the material temperature.

However, regardless of what temperature measuring instrument is used, knowing the temperature of the intermediate member and the support member enables the temperature of the substrate to be inferred. For any given combination of process conditions and spatial relationships between the substrate, intermediate member and support member, a calibration can be made by measuring the temperatures of the intermediate member and support member over a range of substrate temperatures.

An alternative to using a calibration method, is to determine the temperature of the object by application of the following equation:

$$\left(\frac{\alpha_1 \alpha_2}{\alpha_1 + \alpha_2 - \alpha_1 \alpha_2}\right)\left(\frac{\Lambda P(T_2 - T_1)}{A_1}\right) =$$

-continued
$$\left(\frac{\alpha_2 \alpha_3}{\alpha_2 + \alpha_3 - \alpha_2 \alpha_3}\right)\left(\frac{\Lambda P(T_3 - T_2')}{A_2}\right)$$

where:
- $\alpha_n$: accommodation factor for surface n
- $\Lambda$: free molecular thermal conductivity of the gas
- P: gas pressure
- $T_n$: temperature of surface n
- $A_1$: heat transfer area between substrate and intermediate member
- $A_2$: heat transfer area between intermediate member and support member
- surface n=1: surface of object adjacent the intermediate member
- surface n=2: surface of intermediate member adjacent object
- surface n=2': surface of intermediate member adjacent support member
- surface n=3: surface of support member adjacent intermediate member Regardless of whether a calibration, equation, or both are used, it is instructive to use the equation as a basis for designing apparatus of the present invention having minimal measurement error. For example, in the situation where gas pressure and thermal conductivity above and below the intermediate member are equal and the top and bottom heat transfer surfaces of the intermediate member have equal areas, then the above equation becomes $\alpha_{top}\Delta T_{top} = \alpha_{bottom}\Delta T_{bottom}$. Therefore, when the intermediate member has a very high thermal conductivity so that the temperature of both surfaces will be substantially equal, i.e., $T_2$ is substantially equal to $T_2'$, relative to measurement accuracy, and when the system is designed so that the accommodation factor of both sides is about equal, the intermediate member has a temperature of $T_2 = (T_1 + T_3)/2$.

In another aspect of the present invention, a method generally comprises the steps of providing an intermediate member in a space defined between an object to be measured and a second surface, measuring the temperature of the intermediate member and the second surface, and determining the temperature of the substrate. The intermediate member is positioned in a sufficiently close relationship between the adjacent surfaces of the substrate support member and the substrate to have a known thermal relationship. It is preferred that the apparatus is designed so that the thermal relationship is essentially that of free molecular thermal conduction. By measuring the temperature of the intermediate member and the second surface, the temperature of the object can be inferred either through a calibration or by application of the equation above.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a cross-sectional view of an intermediate member of the present invention;

FIG. 3 is a bottom view of an intermediate member of the present invention;

FIG. 4 is a top view of a substrate support member showing two intermediate members positioned therein;

FIG. 6 is a schematic diagram of an optical pyrometer system utilizing a temperature sensitive material and a light probe to provide a temperature reading of the temperature sensitive material.

DESCRIPTION OF A PREFERRED EMBODIMENT

In order to achieve the benefits of the present invention, an inventive system can be configured for repeatedly or continuously measuring the temperature of a substrate 12 based on the surface temperature of an intermediate member or puck 10 maintained in a sufficiently close relationship between the substrate 12 and a substrate support member 14 to have a known thermal relationship therebetween. It is preferred that the apparatus is designed so that the thermal relationship is essentially that of free molecular thermal conduction. By measuring the temperature of the intermediate member and the second surface, the temperature of the object can be inferred either through a calibration or by application of a heat transfer equation.

Figure 1:
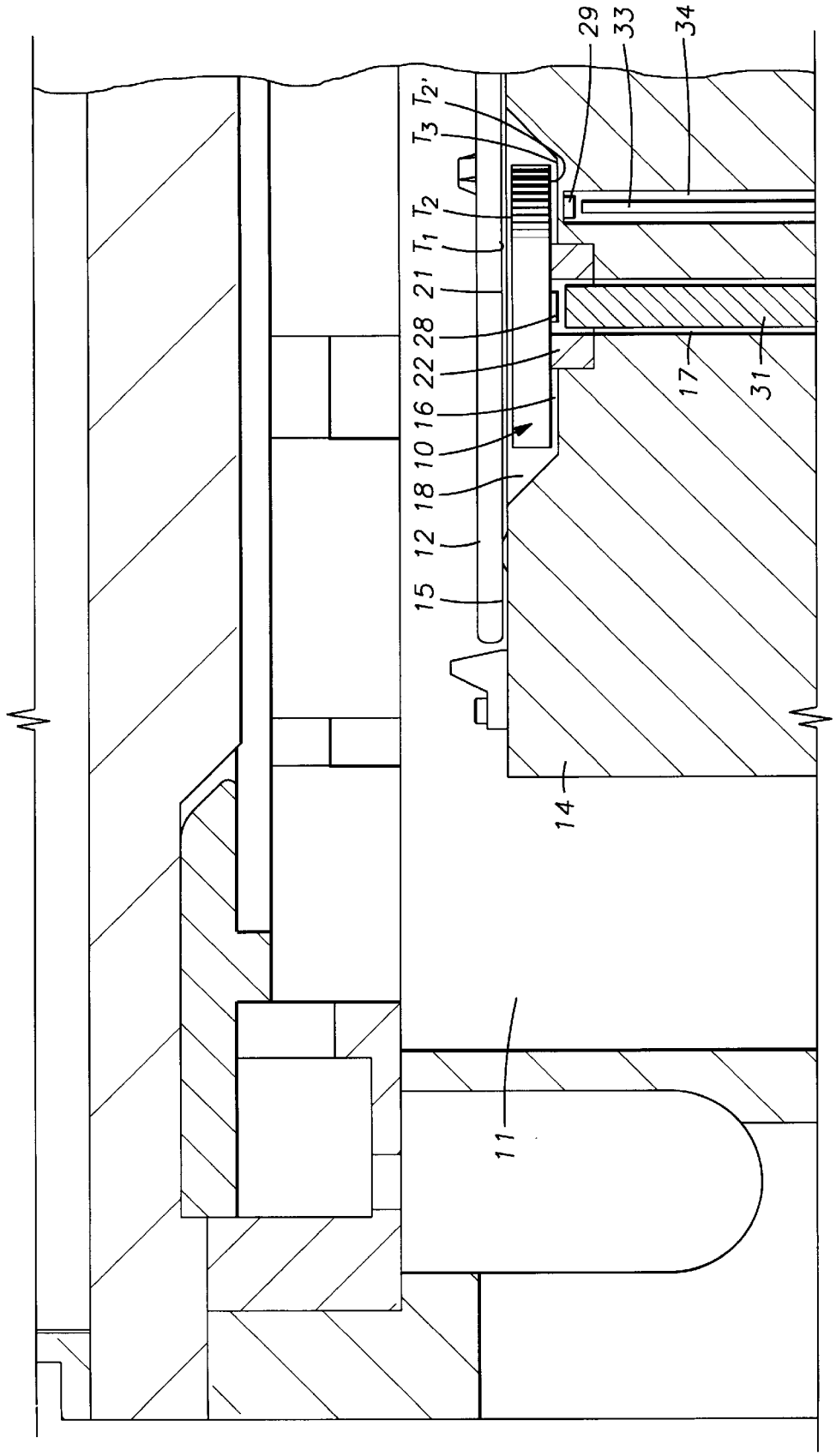
FIG. 1 is a partial cross-sectional view of the chamber of the present invention having a temperature measuring apparatus including a substrate support member, an intermediate member, a light detecting member, and a semiconductor substrate to be measured.

Referring to FIG. 1, a partial cross-sectional view of a chamber of the present invention having a temperature measuring apparatus including a substrate support member, an intermediate member, a light detecting member, and a semiconductor substrate to be measured is illustrated. Semiconductor substrate 12 is illustrated as being located in integrated circuit processing chamber 11, maintained at the usual high vacuum level and including sources (not shown) of materials to be deposited on the substrate 12. The substrate 12 is supported within the chamber 11 on a substrate support member 14. The substrate support member 14 is positioned in the lower portion of the chamber 11. To adhere the substrate 12 to the support 14, an electrostatic chuck or clamping arrangement may be employed.

According to the present invention, an intermediate member 10 is located in a semiconductor processing chamber 11 between the semiconductor substrate 12 and the substrate support member 14. The intermediate member 10 is located in a recess 18 formed in the support member 14. The recess 18 is in fluid communication with the space 15 typically present between the substrate and its mounting surface wherein a gas, such as helium (He), is made to flow for the purpose of controlling the temperature of the substrate 12.

Recess 18 houses the intermediate member 10 so that thermal energy is conducted through the gap 21 between the substrate 12 and intermediate member 10 during processing of the substrate. The use of the intermediate member 10 eliminates the need to place a temperature measuring instrument in direct physical contact with the substrate or subject the substrate itself to processing steps to locate a temperature sensitive material thereon. Rather, the intermediate member 10 is formed with an integral temperature measuring instrument or in some other manner facilitating temperature measurement, such as having a temperature sensitive material 28 on its lower surface in cooperation with a light probe 3 positioned within the channel 17.

Thermal energy is also conducted through the gap 16 from the intermediate member to the substrate support member 14. The temperature of the substrate receiving surface of the support member 14 is measured by any temperature measuring device, such as a temperature sensitive material 29 and light probe 33. It is preferred that the temperature measuring device be protected from the process environment in chamber 11. For this reason, the device is shown positioned in a channel 34 (partially shown) through the support member 14.

In applications where substrate temperature is controlled by thermal conduction via low density gas in the narrow gap 15, typically defined as the space between the substrate 12 and the substrate mounting surface of the support member 14, the intermediate member 10 is located in fluid communication with the low density gas in recess 18. Recess 18 is in fluid communication with narrow gap 15. The intermediate member 10 and the substrate mounting surface of the support member 14 are preferably designed with substantially planar surfaces in substantially parallel planes so that heat transfer between adjacent surfaces will occur substantially uniformly over the entire surface area. The adjacent surface areas for heat transfer, i.e., acceptance and release of heat between the substrate 12 and intermediate member 10 (hereinafter referred to as $A_1$) and the area for heat transfer between the intermediate member 10 and the support member 14 (hereinafter referred to as $A_2$) are largely a matter of design choice, but will be fixed at a known amount for purposes of calibration and/or use in a heat transfer equation. It is preferred that $A_1$ and $A_2$ be substantially equal and as large as practical. Furthermore, the distance between the substrate 12 and the intermediate member 10 (hereinafter referred to as $d_1$) and the distance between the intermediate member 10 and the support member 14 (hereinafter referred to as $d_2$) are largely a matter of design choice, but will be fixed at a known amount. It is preferred that $d_1$ and $d_2$ be substantially the same and as small as practical in order to minimize error in the determination of substrate temperature. It is most preferred that $d_1$ and $d_2$ be on the order of the mean free path of the gas in the chamber during processing.

When a gas having good thermal conductivity is used, such as helium having a thermal conductivity of about $2.93 \times 10^{-2}$ (Watts/cm$^2$)/(°K/torr), a substrate 12 positioned adjacent the intermediate member 10 approaches a steady state temperature within a period of time that is short relative to the substrate processing period, typically on the order of a few seconds. Under conditions of free molecular thermal conduction, i.e., when $d_1$ and $d_2$ are less than the mean free path of the gas ($d_1 < \lambda$, $d_2 < \lambda$), the steady state thermal condition of the present apparatus can be expressed by Equation (1):

$$\left( \frac{\alpha_1 \alpha_2}{\alpha_1 + \alpha_2 - \alpha_1 \alpha_2} \right) \left( \frac{\Delta P(T_2 - T_1)}{A_1} \right) = \left( \frac{\alpha_2' \alpha_3}{\alpha_2' + \alpha_3 - \alpha_2' \alpha_3} \right) \left( \frac{\Delta(T_3 - T_2')}{A_2} \right) \quad \text{Equation (1)}$$

where:

α$_n$: accommodation factor for surface n

Λ: free molecular thermal conductivity of the gas

P: gas pressure

T$_n$: temperature of surface n

A$_1$: heat transfer area between substrate and intermediate member

A$_2$: heat transfer area between intermediate member and support member surface n=1: surface of object adjacent the intermediate member surface n=2: surface of intermediate member adjacent object surface n=2': surface of intermediate member adjacent support member surface n=3: surface of support member adjacent intermediate member In applications where the gas pressure and thermal conductivity above and below the intermediate member area equal, the accommodation factors are constant and the top and bottom heat transfer surface areas of the intermediate member are Known, then the Equation (1) can be simplified as shown in Equation (2):

$$\frac{T_2 - T_1}{T_3 - T_{2'}} = \frac{\Delta T_t}{\Delta T_{bottom}} = \frac{A_1}{A_2} = \text{Constant} \qquad \text{Equation (2)}$$

or as shown in Equation (3):

$$\alpha_{top}\Delta T_{top} = \alpha_{bottom}\Delta T_{bottom} \qquad \text{Equation (3)}$$

Therefore, when the intermediate member has a very high thermal conductivity so that the temperature of both surfaces will be substantially equal, i.e., T$_2$ is substantially equal to T$_2$ relative to measurement accuracy, the temperature of the intermediate member 10 will be a temperature between T$_1$ and T$_2$ according to the ratio of overall accommodation factors, α$_{top}$α$_{bottom}$.

When the temperature measurement according to the present invention is performed under high pressure, i.e., the distances d$_1$ and d$_2$ are greater than the mean free path of the gas (d$_1$>λ, d$_2$>λ), then heat transfer between the substrate 12 and the intermediate member 10 becomes insensitive to gas pressure and becomes an inversely linear function of distance according to Equation (4):

$$\frac{\lambda(T_2 - T_1)}{d_1 A_1} = \frac{\lambda(T_3 - T_{2'})}{d_2 A_2} \qquad \text{Equation (4)}$$

Therefore, when the surface areas are equal and the distances are fixed, the thermal condition of the apparatus in a high pressure gas can be expressed by Equation (5):

$$\frac{\Delta T_t}{\Delta T_b} = \frac{d_1}{d_2} = \text{Constant} \qquad \text{Equation (1)}$$

Referring now to FIG. 2, a cross-sectional view of an intermediate member 10 of the present invention. Intermediate member 10 is comprised of a thin disk 23 having high thermal conductivity and thus a small temperature difference across its surfaces. On the lower surface of disk 23, a reflective layer 26 such as aluminum or gold is formed thereon. A dot of temperature sensitive material 28, such as a phosphor, is centered on the lower surface of the reflective layer 26. An encapsulation layer 30 may be formed over the temperature sensitive material 28 to prevent the material 28 from being exposed to the vacuum environment. The layer 30 is preferably comprised of a dielectric, such as sapphire or diamond. Sapphire and diamond have been found to provide corrosion resistance at high temperatures and prevent eddy currents from heating the temperature sensitive material.

Referring now to FIG. 3, a bottom view of the intermediate member 10 is shown. Reflective layer 26 is the first layer formed on the lower surface of the disk 23 (see FIG. 2). Temperature sensitive material 28 is formed on reflective layer 26. The temperature sensitive material, such as a phosphor compound, may be suspended in an organic binder, a silicone resin binder or a potassium silicate binder. Some of these binders may be the vehicle for a paint which can be maintained in a liquid state until thinly spread over the surface of the reflective layer 26 where it will dry and hold the phosphor on the surface in heat conductive contact with it. A clear encapsulation layer 30 (see FIG. 2) is then formed over reflective layer 26 and temperature sensitive material 28 to protect the material from the vacuum environment.

Referring now to FIG. 4, a top view of a substrate support member 14 shows two intermediate members 24, 25 positioned therein. The intermediate members 24, 25 are located within recesses 18, 19 in the support member. Preferably there are two recesses formed in the support member 14. One recess 18 is typically formed in the center portion of substrate support member 14 and one recess 19 is located in the outer portion of support member 14. This arrangement allows the temperature of the substrate to be measured both at an inner portion of the substrate as well as an outer portion of the substrate. While two intermediate members 24, 25 are preferred, any number and arrangement is contemplated by the present invention.

Referring again to FIG. 1, a preferred method of the present invention will be generally described. The substrate 12 for which the temperature is to be measured is introduced into chamber 11 by a robot (not shown) and positioned on the substrate support member 14. Located between a portion of the substrate 12 and support member 14 is disk member 10 having temperature sensitive material 28 located on the lower surface thereof. A light pipe 31 is positioned within channel 17 of the support member 14 normal to the surface of temperature sensitive material 28. One light detecting apparatus used to advantage in the present invention is available from Luxtron Corporation, Santa Clara, Calif., model no. 790.

The intermediate member 10 preferably has a phosphor coating 28 over at least a portion thereof. The phosphor is characterized by emitting, when excited, electromagnetic radiation within separable band widths at two or more distinct wavelengths and with relative intensities in those bands that vary as a known function of the temperature of the phosphor 28. Thus, the temperature of the phosphor 28 that is detected is substantially the same as or related to that of the substrate as previously described.

Figure 5:
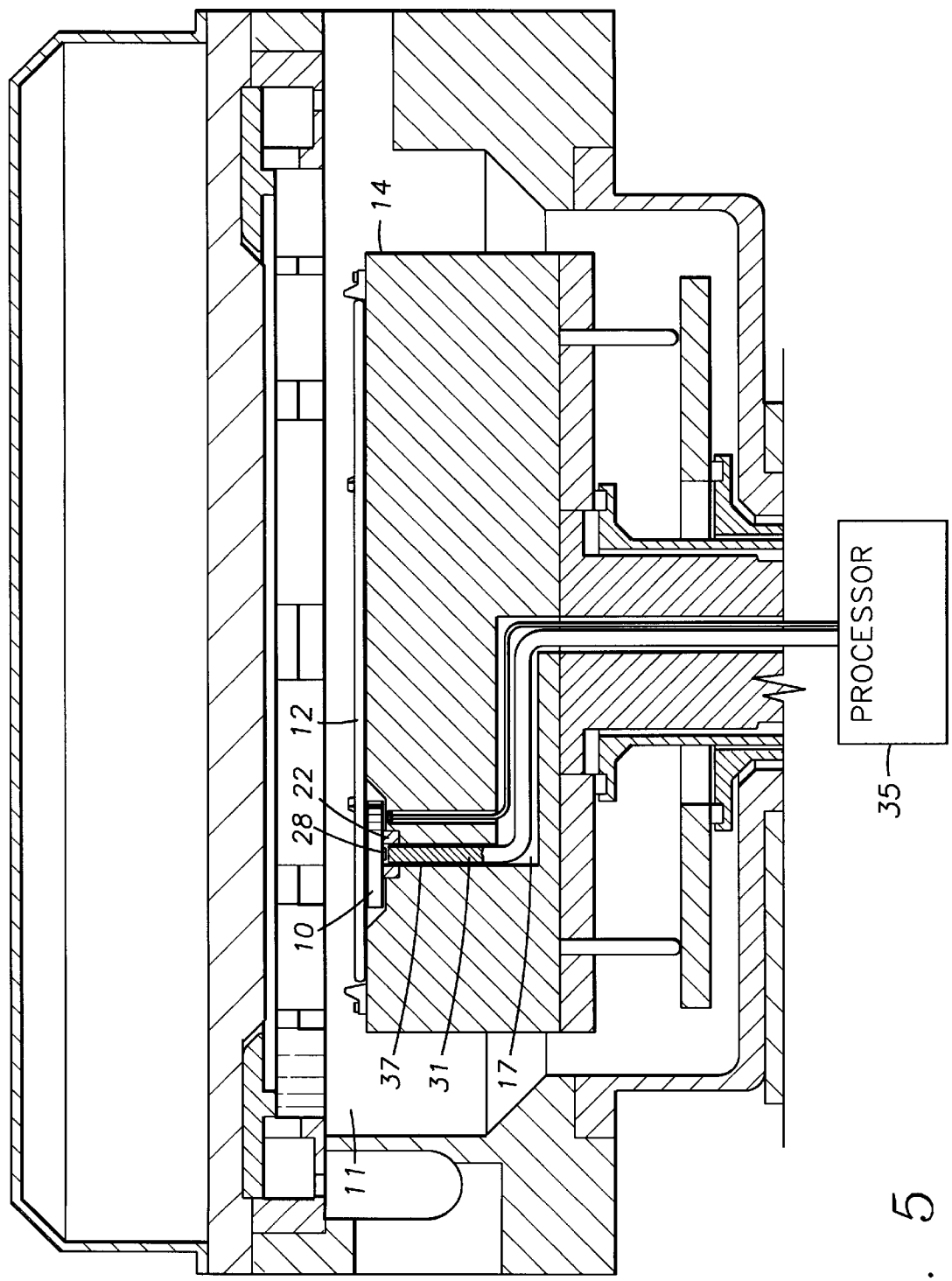
FIG. 5 is a partial cross-sectional view of a processing chamber showing the placement of an intermediate member relative to the support member and substrate.

Referring now to FIG. 5, a partial cross-sectional view of a processing chamber shows the placement of an intermediate member relative to the support member and substrate. The intermediate member 10, dielectric material 22 and support member 14 are positioned below substrate 12 within a process chamber 11. A temperature sensitive material 28, such as a phosphor, is formed on the surface of the intermediate member 10 to emit electromagnetic radiation in cooperation with an optic cable 31. The optic cable 31 has a light receiving end 37 and is capable of transmitting the light or radiation to a processor 35 for determining the temperature of the temperature sensitive material 28. It should be recognized that the optic cable may following any convenient path through the support member 14 to the processor 35.

Now referring to FIG. 6, luminescent emission of the phosphor 28 in the form of electromagnetic radiation, generally in or near the visible spectrum, is excited by a source 60 over a path 61. The source could be radioactive material, a source of cathode rays, an ultraviolet electromagnetic energy source, or any other remote source producing efficient fluorescence depending upon the particular type of phosphor utilized in the preferred forms of the present invention. The relative intensities of two distinct wavelength bands within the emitted radiation 41 contains the desired temperature information.

The emitted radiation 41 is gathered by an optical system 80 and directed in a form 81 onto an optical filter and radiation detector block 100. The block 100 contains filters to isolate each of the two bands or lines of interest within the emitted radiation that contain the temperature information. After isolation, the intensity of each of these bands or lines is detected which results in two separate electrical signals in lines 101 and 102, one signal proportional to the intensity of the radiation in one of the two bands and the other signal proportional to the intensity of the radiation in the other of the two bands of interest. These electrical signals are then applied to an electronic signal processing circuit 120. In a preferred form, the signal processing circuits 120 take a ratio of the signals in the lines 101 and 102 by the use of routinely available circuitry. This electronic ratio signal is then applied to a signal processor within the block 120. The signal processor is an analog or digital device which contains the relationship of the ratio of the two line intensities as a function of temperature for the particular phosphor 28 utilized. This function is obtained by calibration data for the particular phosphor 28. The output of the signal processor 121 is representative of the temperature of the phosphor 28 and may be displayed on a readout device 140. The device 140 could be any one of a number of known read out devices, such as a digital or analog display of the temperature over some defined range. The device 140 could even be as elaborate as a color encoded television picture wherein each color represents a narrow temperature range on the object. It could also be a television picture stored on disc or tape. It might also be a chart recorder or the input to a chamber/process control system.

Referring back to FIG. 1, substrate 12 has a lower surface with a temperature, $T_1$. The intermediate member or disk 10 has upper surface temperature, $T_2$, and lower surface temperature, $T_{2'}$. Watts Recess 18 has lower surface temperature, $T_3$, adjacent the lower surface of disk 10 having temperature $T_{2'}$. Disk 10 is supported in recess 18 on dielectric member 22. The dielectric member 22 holds the intermediate member 10 above the surface of the support member 14 having temperature $T_3$.

In order to measure the temperature of substrate 12, the temperature of disk 10 is determined by measuring emitted radiation from temperature sensitive material 28. The temperature of substrate 12 can be determined from the temperature measured on the lower surface $T_{2'}$ of disk 10 and $T_3$ of support member 14. The temperature of substrate 12 is related to the temperature of the disk 10 by equation (1), above.

Figure 7:
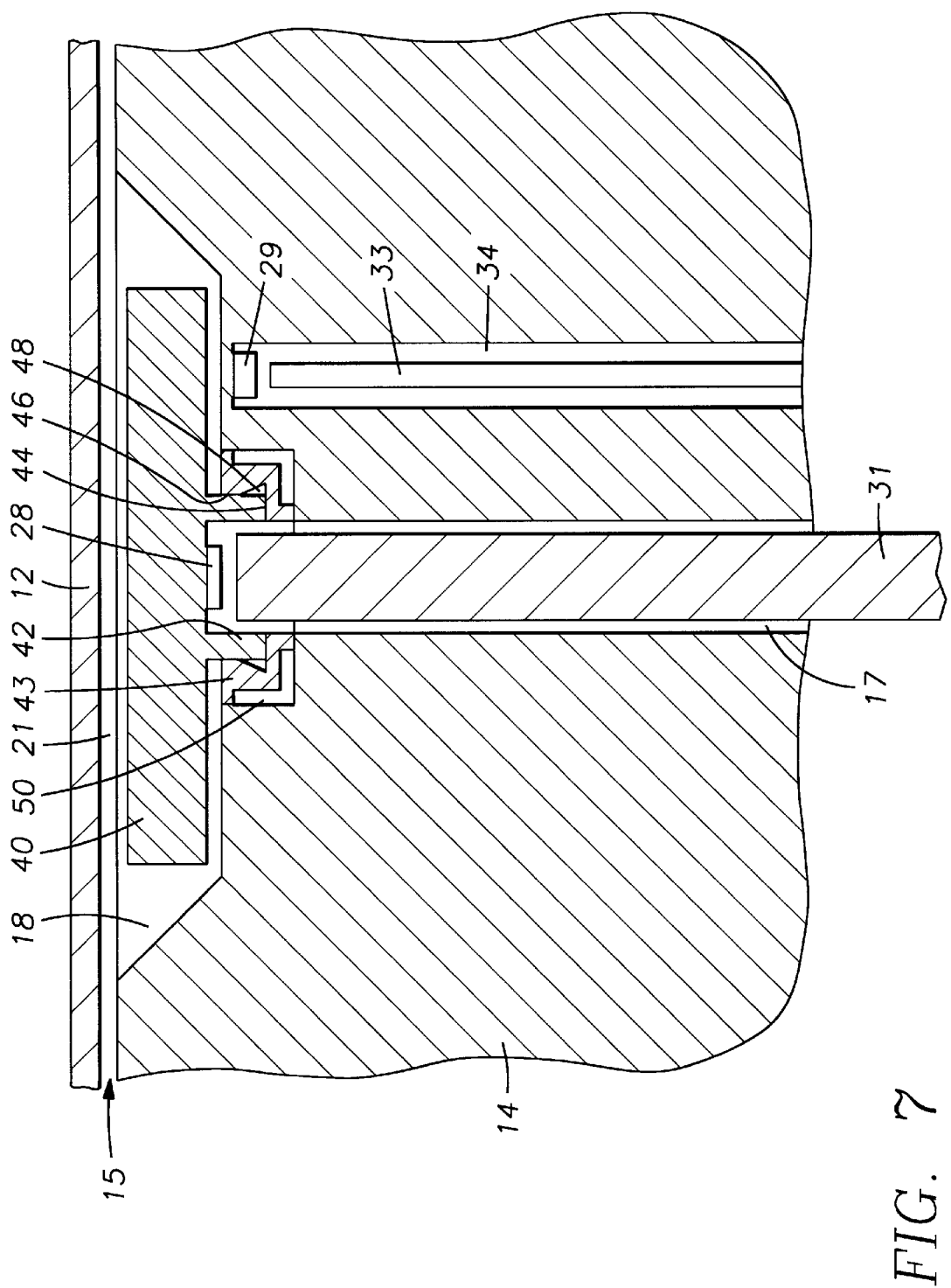
FIG. 7 is a cross-sectional view of a preferred temperature measuring apparatus of the present invention.

Referring now to FIG. 7, a cross-sectional view of a preferred temperature measuring apparatus of the present invention is shown. The intermediate member 40 has pedestal 42 that elevates the intermediate member 40 above the support member 14 and dielectric 43. The amount of heat conduction from intermediate member 40 to the dielectric 43 is minimized by reducing the degree of contact therebetween. While pedestal 42 effectively reduces the degree of contact between the member 40 and the dielectric 43, it should be recognized that the pedestal 42 must hold the intermediate member 40 firmly in place. Because the distances between the substrate 12, intermediate member 40 and support 14 are critical variables in the determination of the substrate temperature $T_1$, as described above, the lower edge of pedestal 42 must be reliably and accurately secured onto the seat 44 of dielectric 43. It is preferred that the pedestal 42 be joined by bonding to dielectric 43 along the side surface 46 rather than the seat 44 so that there is no chance that the bonding material will tilt or elevate the pedestal 42 and intermediate member 40. Any excess glue from side surface 46 will be forced either above the dielectric 43 or into the channel 48 located at the base of side surface 46. In this manner, the intermediate member 40 is secured to the dielectric 43 without jeopardizing the desirably tight tolerances. Furthermore, direct contact between the dielectric 43 and the support member 14 has been reduced by incorporating a gap 50 to minimize heat conduction into the support member 14.

PREFERRED PHOSPHOR MATERIALS AND CHARACTERISTICS

The fundamental characteristics of a preferred phosphor material for use in the present invention is that when properly excited it emits radiation in at least two different wavelength ranges that are optically isolatable from one another, and further that the relative intensity of the radiation emitted within each of these at least two wavelength ranges varies as a function of the phosphor temperature in a known way and at different variance from one another. Phosphor is known to provide these properties, although other materials exhibiting these properties may be used. A phosphor material is preferred that is further characterized by well defined radiation emission in at least two wavelength bands having substantially zero emission above or below a specific wavelength, and, where the radiation is emitted in a band about 100 Å wide. It is also preferred that the lines are easy to isolate and have their own defined bandwidth. However, mixtures of broadband emitters, such as of more conventional non-rare earth phosphors, are also usable so long as two different wavelength ranges of emission of the two materials can be separated sufficiently from one another so that an intensity ratio of the two wavelengths can be measured, and as long as the temperature dependencies of the omitted spectra are sufficiently different for the two phosphors.

For a practical temperature measuring device, the phosphor material selected should also emit radiation in the visible or near visible region of the spectrum since this is the easiest radiation to detect with available detectors, and since radiation in this region is readily transmitted by glass or quartz windows, fibers, lenses, etc. and thus easy to transmit from the intermediate member or disk to a remote measurement site. It is also desirable that the phosphor material selected be an efficient emitter of such radiation in response to some useful and practical form of excitation of the phosphor material. The particular phosphor material or mixture of phosphor materials is also desirably chosen so that the relative change of intensity of emission of radiation within the two wavelength ranges is a maximum within the temperature range to be measured. The phosphor material should also be durable, stable and be capable of reproducing essentially the same results from batch to batch. In the case of fiber optic transmission of the phosphor emission, as described in specific embodiments hereinafter, a sharp line emitting phosphor is desirably selected with the lines having wavelengths near one another so that any wavelength dependent attenuation of the signal by the fiber optic will not significantly affect the measured results at a position remote from the phosphor, thereby eliminating or reducing the necessity for intensity compensation that might be necessary if fibers of varying lengths were used.

One example of a phosphor material having a composition capable of providing the characteristics outlined above may be represented very generally by the generic chemical formula $A_xB_yC_z$, wherein A represents one or more cations, B represents one or more anions, A and B together forming an appropriate non-metallic host compound, and C represents one or more activator elements that are compatible with the host material. The variables x and y are small integers and z is typically in the range of a few hundredths or less.

There are a large number of known existing phosphor compounds from which those satisfying the fundamental characteristic discussed above may be selected by a trial and error process. A preferred group of elements from which the activator element C is chosen is any of the rare earth ions having an unfilled f-electron shell, all of which have sharp isolatable fluorescent emission lines of 10 angstroms bandwidth or less. Certain of these rare earth ions having comparatively strong visible or near visible emission are preferred for convenience of detecting, and they are typically in the trivalent form: praseodymium (Pr), samarium (Sm), europium (Eu), terbium (Tb), dysprosium (Dy), holmium (Ho), erbium (Er) and thulium (Tm). Other activators such as neodymium (Nd) and ytterbium (Yb) might also be useful if infra-red sensitive detectors are used. Other non-rare earth activators having a characteristic of sharp line emission which might be potentially useful in the present invention would include uranium (U) and chromium (Cr). The activator ion is combined with a compatible host material with a concentration of something less than 10 atom percent relative to the other cations present, and more usually less than 1 atom percent, depending on the particular activator elements and host compounds chosen.

A specific class of compositions which might be included in the phosphor layer 40 is a rare earth phosphor having the composition $(RE)_2O_2S:X$, wherein RE is one element selected from the group consisting of lanthanum (La), gadolinium (Gd) and yttrium (Y), and X is one doping element selected from the group of rare earth elements listed in the preceding paragraph having a concentration in the range of 0.01 to 10.0 atom percent as a substitute for the RE element. A more usual portion of that concentration range will be a few atom percent and in some cases less than 0.1 atom percent. The concentration is selected for the particular emission characteristics desired for a given application.

Such a phosphor compound may be suspended in an organic binder, a silicone resin binder or a potassium silicate binder. Certain of these binders may be the vehicle for a paint which can be maintained in a liquid state until thinly spread over a surface whose temperature is to be measured where it will dry and thus hold the phosphor on the surface in heat conductive contact with it.

It is specifically contemplated that the present invention is useful for various types of semiconductor processes and processing devices, such as a physical vapor deposition (PVD) chamber or a chemical vapor deposition (CVD) chamber for depositing a conductor, semiconductor or dielectric film on a substrate, a plasma etch chamber, or other process and apparatus requiring that an object be positioned and secured in the achieved position.

While the foregoing is directed to the preferred embodiment of the present invention, other and further embodiments of the invention may be devised without departing from the basic scope thereof. The scope of the invention is determined by the claims which follow.

We claim:

1. A method of determining the temperature of a substrate, the method comprising the steps of:
   a) disposing an intermediate member between the substrate and a support member;
   b) flowing a gas adjacent the intermediate member;
   c) measuring the temperature of the intermediate member;
   d) measuring the temperature of the support member; and
   e) determining the temperature of the substrate from the temperature of the intermediate member. therein for receipt of the intermediate member.

2. The method of claim 1, further comprising the step of calibrating the thermal relationship of the substrate temperature as a function of a range of intermediate member temperatures and support member temperatures.

3. The method of claim 1, wherein the intermediate member is located in a recess provided in the support member, the recess being in fluid communication with a temperature controlling gas.

4. The method of claim 1, wherein the intermediate member is insulated from the support member by a dielectric material.

5. The method of claim 1, wherein the intermediate member is in free molecular thermal conduction with the substrate and substrate support member.

6. A method of determining the temperature of a substrate, the method comprising the steps of:
   a) disposing an intermediate member having a high thermal conductivity between the substrate and a support member, wherein the intermediate member has a temperature sensitive material located thereon, the temperature sensitive material characterized by emitting, when excited, detectable optical radiation that varies as a known function of the temperature;
   b) flowing a gas adjacent the intermediate member;
   c) measuring the temperature of the intermediate member by exposing the temperature sensitive material to a source of fluorescence to cause an emission and providing an optical fiber between a position adjacent the temperature sensitive material and a detecting station to measure the emission;
   d) measuring the temperature of the support member; and
   e) determining the temperature of the substrate from a relationship between the temperature of the intermediate member and the support member.

7. The method of claim 6, wherein the temperature sensitive material is a phosphor.

8. The method of claim 7, wherein the intermediate member has a reflective film layer formed on the lower surface of the intermediate member and the phosphor is located on the reflective layer.

9. The method of claim 8, wherein the reflective layer is selected from the group consisting of gold and aluminum.

10. A non-contact method of determining the temperature of a substrate, the method comprising the steps of:
    a) disposing an intermediate member between the substrate and a substrate support member;
    b) flowing a gas adjacent the intermediate member;
    c) measuring the temperature of the intermediate member;
    d) measuring the temperature of the support member; and
    e) determining the temperature of the substrate from a relationship between the temperature of the intermediate member and the support member.

11. The method of claim 7, wherein the substrate temperature is determined according to the following equation:

$$\left(\frac{\alpha_1\alpha_2}{\alpha_1+\alpha_2-\alpha_1\alpha_2}\right)\left(\frac{\Lambda P(T_2-T_1)}{A_1}\right) = \left(\frac{\alpha_2\alpha_3}{\alpha_2+\alpha_3-\alpha_2\alpha_3}\right)\left(\frac{\Lambda P(T_3-T_{2'})}{A_2}\right)$$

where:
- $\alpha_n$: accommodation factor for surface n;
- $\Lambda$: free molecular thermal conductivity of the gas;
- P: gas pressure;
- $T_n$: temperature of surface n;
- $A_1$: heat transfer area between substrate and intermediate member;
- $A_2$: heat transfer area between intermediate member and support member;
- surface n=1: surface of object adjacent the intermediate member;
- surface n=2: surface of intermediate member adjacent object;
- surface n=2': surface of intermediate member adjacent support member; and
- surface n=3: surface of support member adjacent intermediate member.

12. An apparatus for determining the temperature of a semiconductor substrate without contacting the substrate, comprising:
a) a chamber;
b) a substrate support member located in the chamber, the support member having a substrate receiving surface and a first temperature measuring device;
c) an intermediate member located adjacent the substrate receiving surface of the support member having a temperature sensitive material disposed thereon; and
d) a second temperature measuring device disposed in cooperation with the intermediate member for measuring the temperature of the intermediate member.

13. The apparatus of claim 12, further comprising a dielectric member insulating the intermediate member from the support member.

14. An apparatus for determining the temperature of a semiconductor substrate without contacting the substrate, comprising:
a) a chamber;
b) a substrate support member located in the chamber, the support member having a substrate receiving surface and a first temperature measuring device;
c) an intermediate member located adjacent the substrate receiving surface of the support member and having a temperature sensitive element disposed thereon; and
d) a second temperature measuring device disposed in cooperation with the intermediate member for measuring the temperature of the intermediate member, wherein the second temperature measuring device is a light detecting member.

15. The apparatus of claim 14, wherein the support member defines a recess therein for receipt of the intermediate member.

16. The apparatus of claim 15, wherein the recess is in fluid communication with a temperature controlling gas flowing in a passage between the substrate and the support member.

17. The apparatus of claim 14, wherein the light detecting member includes a processor to determine the temperature of the substrate from the temperature of the intermediate member.

18. The apparatus of claim 14, wherein the intermediate member is a disk comprised of a dielectric material.

19. The apparatus of claim 18, wherein the dielectric material is selected from the group consisting of ceramics and semiconductors.

20. The apparatus of claim 18, wherein the dielectric material is a ceramic selected from the group consisting of sapphire, diamond, magnesium oxide, glass, quartz, zirconia, silicon and germanium.

21. The apparatus of claim 18, wherein the dielectric material is a semiconductor selected from the group consisting of silicon and germanium.

22. An apparatus for determining the temperature of a semiconductor substrate without contacting the substrate, comprising:
a) a chamber;
b) a substrate support member located in the chamber, the support member having a substrate receiving surface and a first temperature measuring device;
c) an intermediate member located adjacent the substrate receiving surface of the support member; and
d) a second temperature measuring device disposed in cooperation with the intermediate member for measuring the temperature of the intermediate member, wherein the second temperature measuring assembly comprises a reflective layer disposed on the intermediate member, and a temperature sensitive material disposed on the reflective layer, and a light detecting member for detecting light emitted from the temperature sensitive material.

23. A method for detecting the temperature of an object through a non-contact arrangement, the method comprising the steps of:
a) providing an intermediate member having high thermal conductivity in a space defined between the object to be measured and a support member supporting the object to be measured;
b) detecting the temperature of the intermediate member by detecting the emission of radiation from a temperature sensitive material disposed on the intermediate member;
c) detecting the temperature of the support member; and
d) determining the temperature of the object from the temperature of the intermediate member and the temperature of the support member.

24. A method for detecting the temperature of an object, the method comprising the steps of:
a) providing an intermediate member having high thermal conductivity in a space defined between the object to be measured and a support member supporting the object to be measured, wherein the intermediate member is provided with a temperature sensitive element located on one side thereof, the temperature sensitive element having temperature sensitive luminescent properties and cooperating with a light detecting member to detect light emitted from the temperature sensitive element;
b) detecting the temperature of the intermediate member;
c) detecting the temperature of the support member; and
d) determining the temperature of the object from the temperature of the intermediate member and the temperature of the support member.

25. A method for detecting the temperature of an object, the method comprising the steps of:
   a) providing an intermediate member having high thermal conductivity in a space defined between the object to be measured and a support member supporting the object to be measured;
   b) detecting the temperature of the intermediate member;
   c) detecting the temperature of the support member; and
   d) determining the temperature of the object through application of the equation:

$$\left(\frac{\alpha_1\alpha_2}{\alpha_1 + \alpha_2 - \alpha_1\alpha_2}\right)\left(\frac{\Lambda P(T_2 - T_1)}{A_1}\right) = \left(\frac{\alpha_2\alpha_3}{\alpha_2 + \alpha_3 - \alpha_2\alpha_3}\right)\left(\frac{\Lambda P(T_3 - T_2')}{A_2}\right)$$

where:
   $\alpha_n$: accommodation factor for surface n;
   $\Lambda$: free molecular thermal conductivity of the gas;
   P: gas pressure;
   $T_n$: temperature of surface n;
   $A_1$: heat transfer area between substrate and intermediate member;
   $A_2$: heat transfer area between intermediate member and support member;
   surface n=1: surface of object adjacent the intermediate member;
   surface n=2: surface of intermediate member adjacent object;
   surface n=2': surface of intermediate member adjacent support member; and
   surface n=3: surface of support member adjacent intermediate member.

26. A method for measuring the temperature of a substrate on a substrate support member, comprising the steps of:
   a) providing an intermediate member between a substrate and the substrate support member in a processing chamber, the intermediate member having a reflective surface with a temperature sensitive material formed thereon;
   b) measuring the fluorescent decay of the material on the intermediate member to determine the temperature thereof; and
   c) determining the temperature of the substrate from the temperature of the intermediate member.

27. The method of claim 26, wherein the reflective film layer is formed on a lower surface of the intermediate member and the temperature sensitive material is phosphor.

28. The method of claim 27, wherein the reflective layer is selected from the group consisting of gold and aluminum.

29. The method of claim 26, wherein the step of measuring the fluorescent decay comprises providing a light pipe in the support member, the light pipe having a light receiving end that is substantially normal to the reflective surface of the floating member.

30. The method of claim 26, wherein the intermediate member comprises a disk made of a material which is transparent to infrared light.

31. The method of claim 30, wherein the disk has a sufficiently high thermal conductivity so that the temperature difference across the disk is less than the standard error in measuring the fluorescent decay.

32. The method of claim 31, wherein the disk is comprised of a material selected from the group consisting of sapphire, diamond, magnesium oxide, glass, quartz, silicon, germanium, zirconia and alumina oxide.

33. The method of claim 32, wherein the disk has a phosphor dot located thereon and a protective, non-corrosive layer formed over the dot.

34. An apparatus for determining the temperature of an object without contacting the object, comprising:
   a) an object support member having an object receiving surface and a first temperature measuring device;
   b) an intermediate member located adjacent the object receiving surface of the support member having a temperature sensitive material disposed thereon; and
   c) a second temperature measuring device disposed in cooperation with the intermediate member for measuring the temperature of the intermediate member.

35. An apparatus for determining the temperature of an object without contacting the object, comprising:
   a) an object support member having an object receiving surface and a first temperature measuring device;
   b) an intermediate member located adjacent the object receiving surface of the support member; and
   c) a second temperature measuring device in cooperation with the intermediate member for measuring the temperature of the intermediate member, wherein the second temperature measuring device is a light detecting member for detecting light emitted from a temperature sensitive element formed on the intermediate member.

36. The apparatus of claim 35, wherein the support member defines a recess therein for receipt of the intermediate member.

* * * * *

UNITED STATES PATENT AND TRADEMARK OFFICE
CERTIFICATE OF CORRECTION

PATENT NO. : 5,876,119

DATED : March 2, 1999

INVENTOR(S) : Ishikawa et al.

It is certified that error appears in the above-indentified patent and that said Letters Patent is hereby corrected as shown below:

In column 12, lines 13-14, please delete "therein for receipt of the intermediate member."

Signed and Sealed this

Ninth Day of November, 1999

Q. TODD DICKINSON

Attest:

*Attesting Officer*  *Acting Commissioner of Patents and Trademarks*